United States Patent [19]

Iwata et al.

[11] Patent Number: 4,514,826
[45] Date of Patent: Apr. 30, 1985

[54] RELATIONAL ALGEBRA ENGINE

[75] Inventors: Kazuhide Iwata; Shigeki Shibayama, both of Yokohama; Yutaka Hidai; Shigeru Oyanagi, both of Tokyo, all of Japan

[73] Assignee: Tokyo Shibaura Denki Kabushiki Kaisha, Kawasaki, Japan

[21] Appl. No.: 364,872

[22] Filed: Apr. 2, 1982

[30] Foreign Application Priority Data

May 18, 1981 [JP] Japan .................... 56-74564
May 18, 1981 [JP] Japan .................... 56-74565

[51] Int. Cl.³ .................... G06F 7/24; G06F 7/02
[52] U.S. Cl. .................... 364/900
[58] Field of Search .................... 364/200, 300, 900

[56] References Cited

U.S. PATENT DOCUMENTS

| | | | |
|---|---|---|---|
| 3,713,107 | 1/1973 | Barsamian | 364/200 |
| 3,931,612 | 1/1976 | Stevens et al. | 364/900 |
| 4,030,077 | 6/1977 | Florence et al. | 364/900 |
| 4,078,260 | 3/1978 | Chen et al. | 364/900 |
| 4,209,845 | 6/1980 | Berger et al. | 364/900 |
| 4,210,961 | 7/1980 | Whitlow et al. | 364/300 |

OTHER PUBLICATIONS

IBM J. Res. Develop., vol. 22, No. 5, Sep. 1978, pp. 509-517, *Algorithm and Hardware for a Merge Sort Using Multiple Processors*, by S. Todd.

*Primary Examiner*—Gareth D. Shaw
*Assistant Examiner*—Daniel K. Dorsey
*Attorney, Agent, or Firm*—Oblon, Fisher, Spivak, McClelland & Maier

[57] ABSTRACT

Disclosed is a relational algebra engine which has a sort engine, a merge engine, a control processor and a common bus. The sort engine has a plurality of first processing elements which are connected in series. Each first processing element includes first and second buffer memories, a first memory which has a FIFO function, and a first processor which sorts input data elements in accordance with a predetermined rule by using the first and second buffer memories and the first memory which has the FIFO function. The first and second buffer memories and the first memory which has the FIFO function are disposed in parallel. The merge engine has two second processing elements which are disposed in parallel. Each second processing element includes a third buffer memory, a second memory which has the FIFO function, a second processor which merges the data elements sorted in the sort engine by using the third buffer memory and the second memory which has the FIFO function and an output buffer memory which stores the data elements merged in the second processor. The third buffer memory is disposed parallel to the second memory which has the FIFO function.

6 Claims, 6 Drawing Figures

RELATIONAL ALGEBRA ENGINE

BACKGROUND OF THE INVENTION

The present invention relates to a relational algebra engine which performs a set operation at high speed in a data base system which deals with a relational model.

When a data base system is to be established, abstract data of the real world must be modeled. Data models which are conventionally proposed include hierarchical model, network model and relational model. Among these models, the relational model is most promising. A concept of relation in mathematical set theory is applied to this model.

In data base systems which utilize the hierarchical model and the network model, data is strung by the chain of pointers. Therefore, the data structure more or less depends on an application program. On the other hand, in a data base system utilizng the relational model, data is expressed as a set so that the data structure is simple and each data is highly independent. In other words, the relational data base system has an advantage in that, even if part of the data base is modified, the application program thereof is not influenced. From this point of view, an extensive study has been made for implementing the relational model to establish a data base system of large capacity and a knowledge data base system.

General purpose computers which are currently used are designed to perform arithmetic operations at high speed. Therefore, the relational data base processing must be executed with software in the general purpose computer. In a data base which deals with a large amount of data, the application program becomes very complex and the processing time thereof becomes long. It has been desired, therefore, that hardware for effectively performing the set operation of the relational model in a data base system be developed.

SUMMARY OF THE INVENTION

It is an object of the present invention to provide a relational algebra engine which effectively performs at high speed a set operation required for a data base system for dealing with a relational model.

A relational algebra engine according to the present invention comprises a sort engine, a merge engine, a control processor and a common bus. The sort engine comprises first processing elements which are mutually connected in series. Each first processing element comprises two buffer memories, a memory which has a FIFO function, and a processor which sorts data elements by using two types of memories as described above. The merge engine has two second processing elements which are disposed in parallel. Each second processing element comprises a buffer memory, a memory which has a FIFO function, a processor which merges data elements by using the memories, and an output buffer memory which stores the merged results. The sort engine, the merge engine and the control processor are connected by the common bus.

The relational algebra engine with the above structure performs set operations at high speed and hardward therefor in practice is easy to construct.

BRIEF DESCRIPTION OF THE DRAWINGS

Other objects and many of the attendant advantages of the present invention will be readily appreciated as the same becomes better understood by reference to the following detailed description when considered in connection with the accompanying drawings, in which like reference characters designate the same or similar parts throughout the Figures thereof and wherein.

DETAILED DESCRIPTION OF THE PREFERRED EMBODIMENTS

Figure 1:
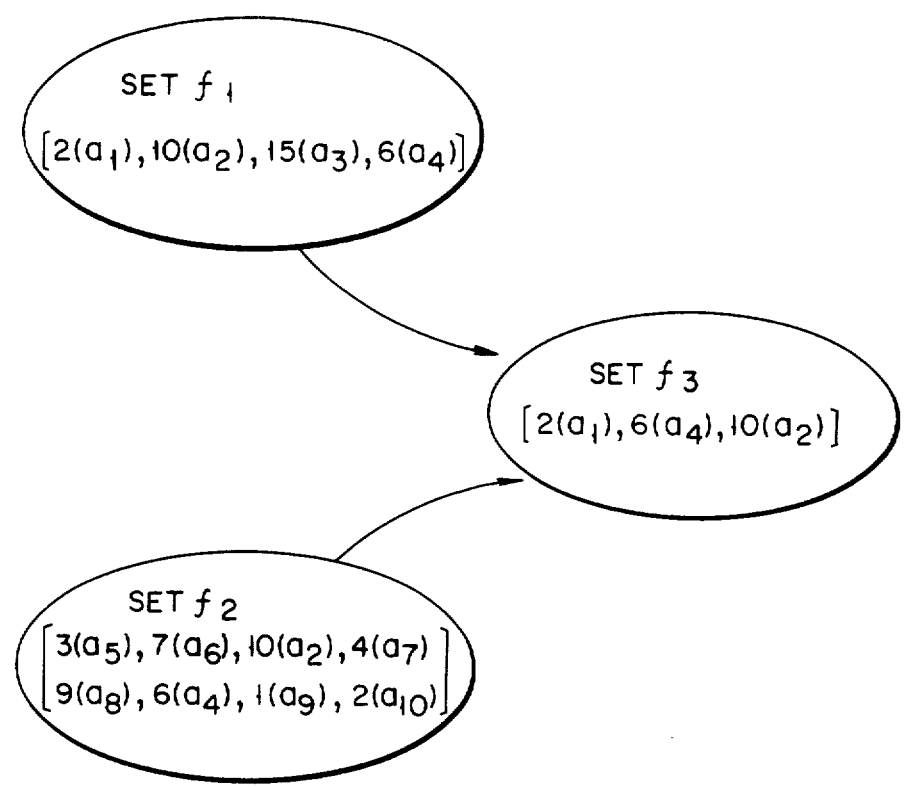
FIGS. 1 and 2 are views for explaining the concept of a set operation.
Figure 2:
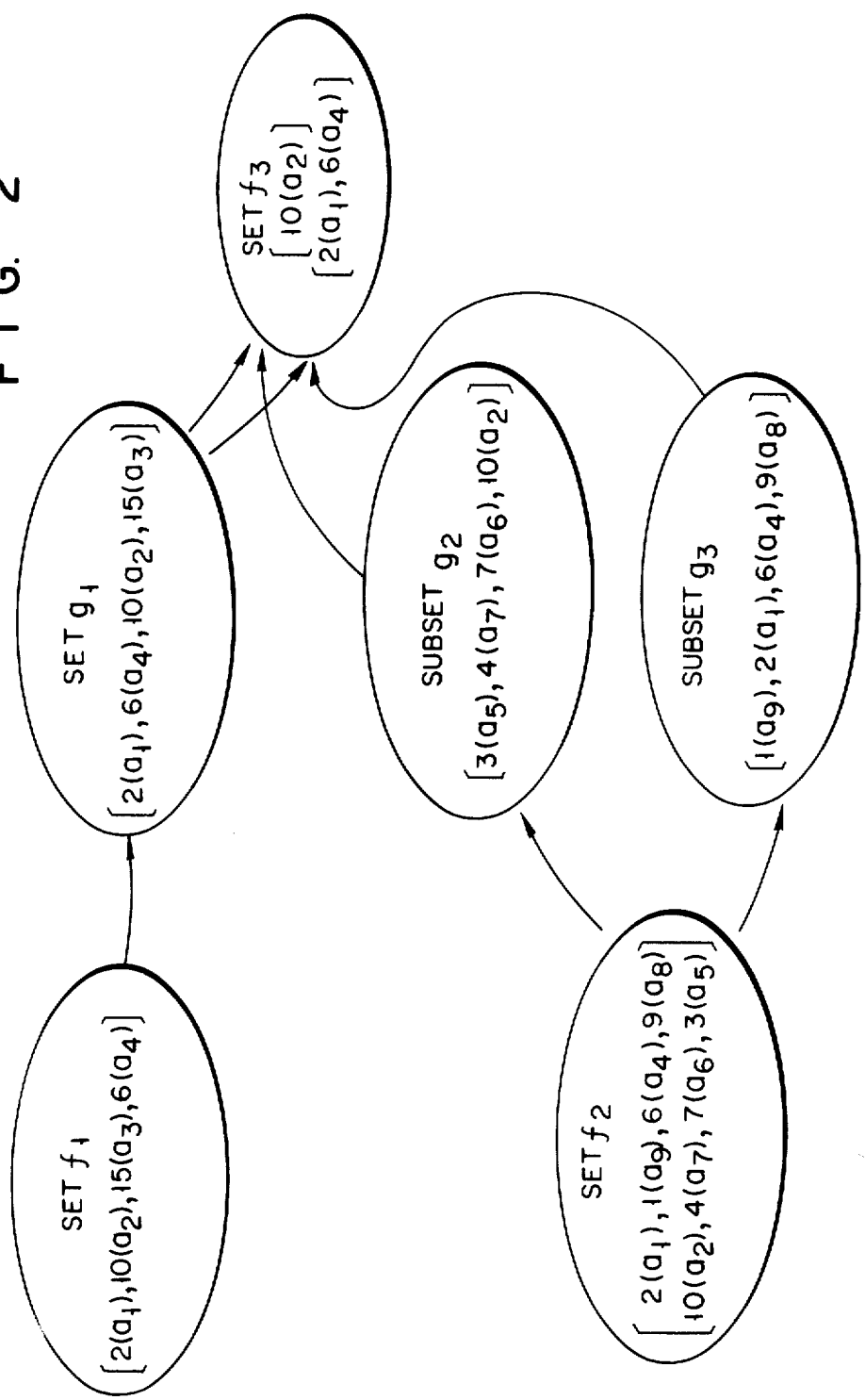

FIGS. 1 and 2 are views for explaining the concept of a set operation according to the present invention. In principle, as shown in FIG. 1, a set f3 which comprises data elements common in two sets f1 and f2 is formed. Conventionally, a data element is called a record or a tuple. It consists of a plurality of attributes and is divided into a key attribute and satellite attributes. A key attribute is the object of operation and satellite attributes are additional ones. In FIGS. 1 and 2, a data element consisting of two attributes and a key attribute is represented by a numerical value and a satellite field is represented by an alphabetical letter. In this set operation, in the first step, a set which has the smaller number of data elements is selected, as shown in FIG. 2. Selected data elements are sorted according to the key order. The data elements [2(a1), 10(a2), 15(a3) 6(a4)] which are input in this order are sorted in accordance with a predetermined rule (ascending order or descending order), for example, in the ascending order. Thus, the sorted data array [2(a1), 6(a4), 10(a2), 15(a3)] is obtained. This set is defined as set g1.

In the second step, data elements of the set f2 are input. A subset which has the same number of data elements as in the set f1 is then formed from the set f2. The data elements in the subset are sorted in the same manner as in the set f1. Subsequently, another subset of the set f2 are formed in the manner as described above. For example, as shown in FIG. 2, when the data elements of the set f2 are input in the order of [3(a5), 7(a6), 4(a7), 10(a2), 9(a8), 6(a4), 1(a7), 2(a1)], sorted subsets g2 [3(a5), 4(a7), 7(a6), 10(a7), and g3 [1(a9), 2(a1), 6(a4), 9(a8)] are obtained.

In the third step, the data elements of the subset g2 and the set g1 are merged to extract the common data element [10(a2)]. Further, the data elements of the subset g3 and the set g1 are merged to extract the common data elements [2(a1), 6(a4)]. The set f3 [2(a1), 6(a4), 10(a2)] is formed from the common data elements.

Figure 3:
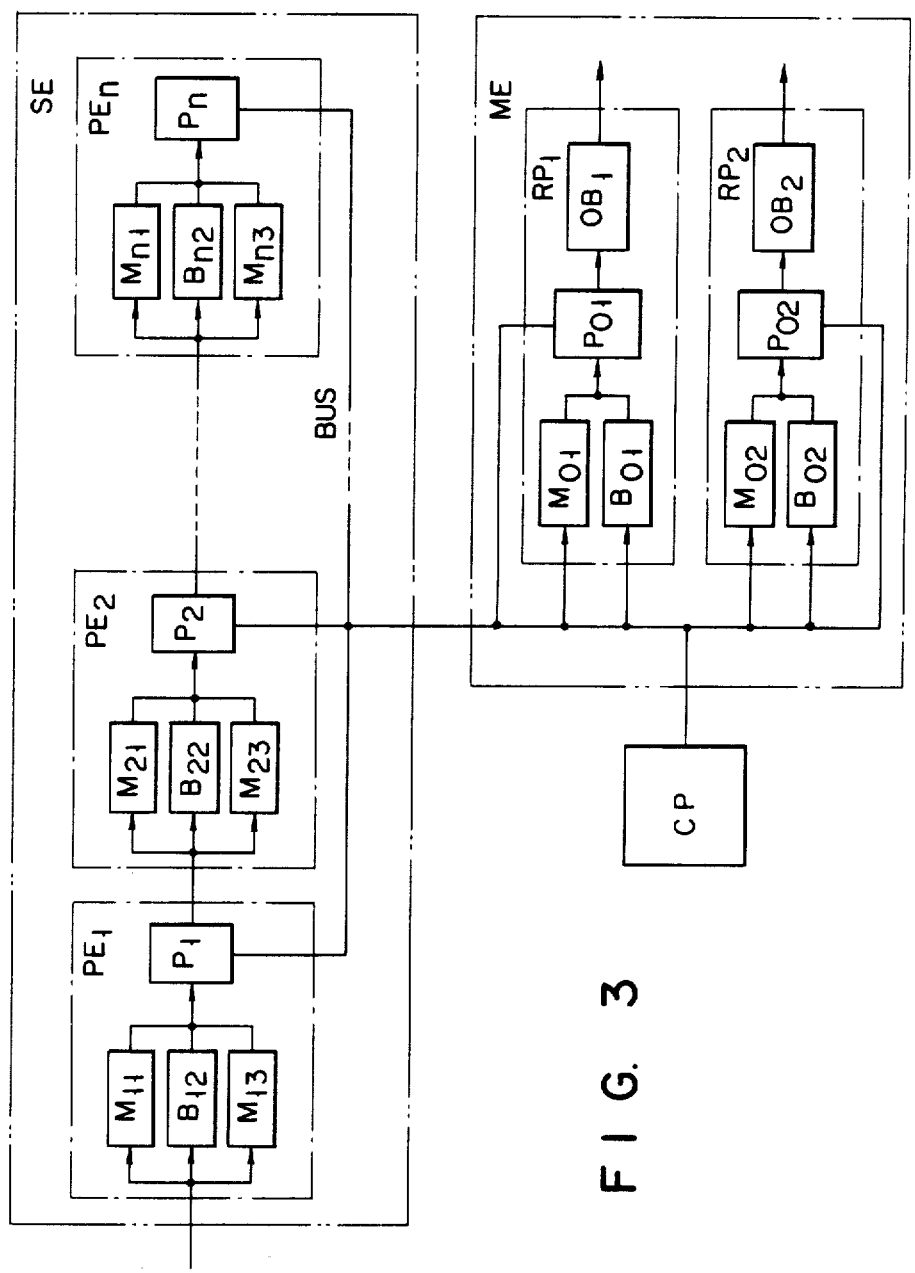
FIG. 3 is a block diagram of a relational algebra engine according to one embodiment of the present invention.

FIG. 3 is a block diagram of a relational algebra engine for performing the sort/merge algorithm according to a first embodiment of the present invention.

A sort engine SE has a plurality (n) of first processing elements PE1, PE2, . . . , PEn which are connected in series. Each first processing element PEk (k = 1, 2, . . . , n) comprises two buffer memories Mk1 and Mk3, a memory Bk2 which has a first-in/first-out (FIFO) function, and a processor Pk which sorts input data by utilizing the three memories described above. The memory Bk2 comprises a RAM which simultaneously reads out and writes data, that is, performs parallel accessing and which has the FIFO function. The processor Pk reads out data stored in the buffer memory Mk1 and the memory Bk2 or in the buffer memory Mk3 and the memory Bk2 and compares data in accordance with a predetermined rule so that data are transferred to the next stage in the ascending order.

The first processing element PE1 at the first stage of the sort engine SE sorts a group of two data elements from a channel. The first processing element PE2 at the second stage of the sort engine SE sorts a group of four data elements from two groups of two data elements which have been sorted in the first processing element PE1 at the first stage of the sort engine SE. The first processing element PEn at the nth stage of the sort engine SE sorts a group of $2^n$ data elements which from two groups of $2^{n-1}$ data elements which have been sorted by the first processing element PEn−1 at the (n−1)th stage of the sort engine SE. In general, $2^n$ data elements are sorted through the first processing elements of stages.

A merge engine ME comprises two second processing elements RP1 and RP2 which are disposed parallel to each other. The second processing element RP1 or RP2 comprises a buffer memory MO1 or MO2, a memory BO1 or B02 which has the FIFO functon, a processor PO1 or PO2 which merges two sets of sorted data elements by utilizing the buffer memory MO1 or MO2 and the memory BO1 or BO2, and transfers coincident data to an output buffer memory OB1 or OB2. The processor PO2 operates in the same manner as the processor PO1 and transfers coincident data to the output buffer memory OB2.

These two processing elements RP1 and RP2 continuously perform the merge operation in synchronism with the processing speed of the sort engine by alternately receiving the sorted subsets transmitted from the sort engine.

The merge engine ME with the above structure is connected to the sort engine SE and a control processor CP through a common bus. The control processor CP first controls the sort engine SE so as to sort the input data elements. The sorted data elements are fed to the merge engine ME wherein these data elements are merged. In this manner, the control processor CP controls the pipeline processing of the algorithm of the set operation.

Figure 4:
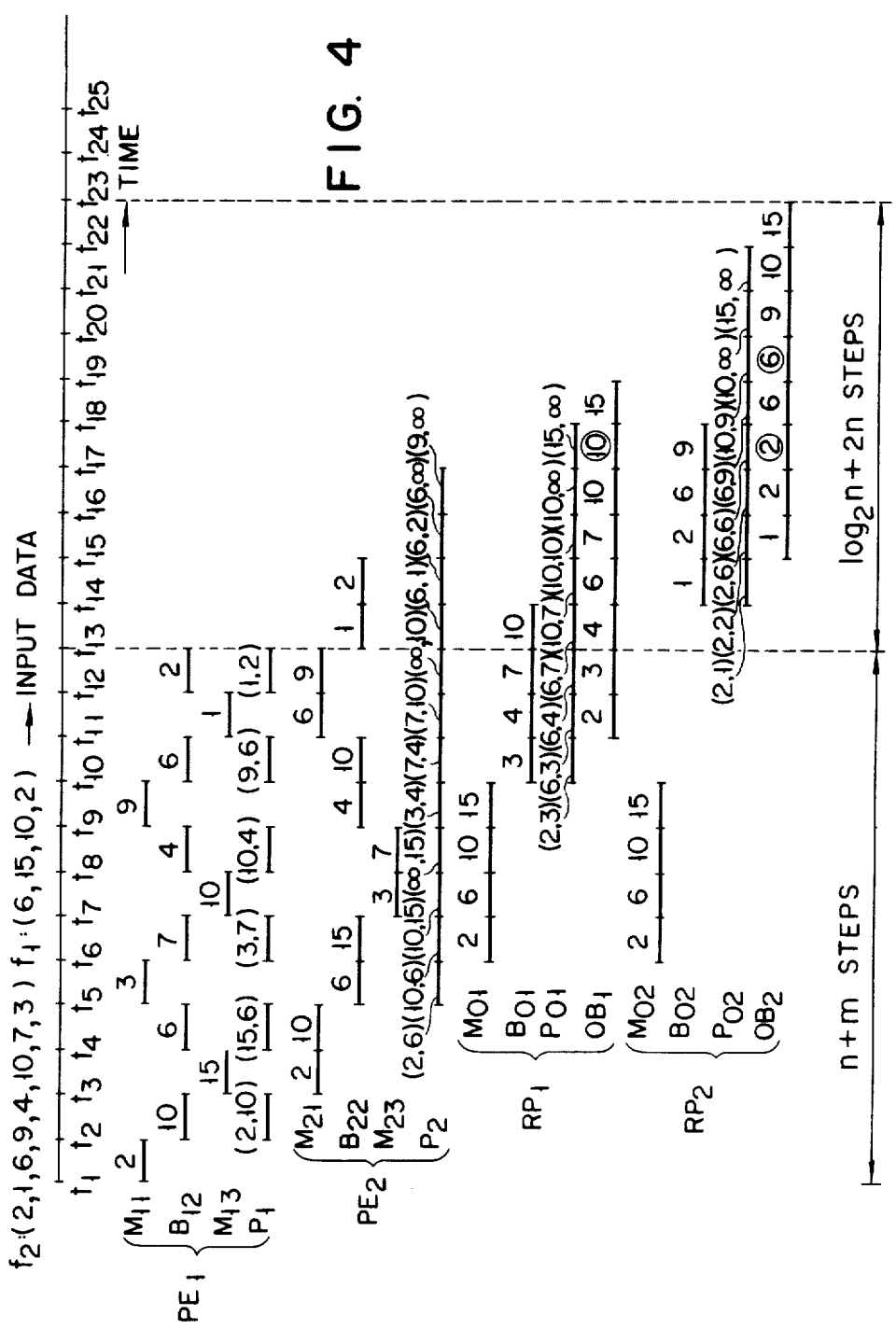
FIG. 4 is a timing chart for explaining the process of the relational algebra engine of FIG. 3.

The set operation of the relational algebra engine according to the present invention will be described with reference to the timing chart of FIG. 4. The set operation aims at obtaining the set f3 by selecting the common data elements of the sets f1 and f2. The set f1 has data elements (2, 10, 15, 6) and the set f2 has data elements (3, 7, 10, 4, 9, 6, 1, 2). The data element consists of key and satellite information, but the satellite information is omitted in this description to simplify the figure. Referring to FIG. 4, time is plotted in the abscissa of the timing chart. The processing data elements and their status are plotted in the ordinate of the timing chart.

Assume that the number of data elements in the set f1 is defined as n and the number of data elements in the set f2 is defined as m. A set which has a smaller number of data elements is first input. In the example of FIG. 4, since n=4 and m=8, the data elements of the set f1 are first input. The data elements are sequentially written in the memories M11, B12 and M13 of the first processing element PE1 in the first stage of the sort engine SE in the order of M11, B12, M13, B12, M11, B12, ... Every time a group of two data elements is input to the processor P1 at the first stage, the two data elements are compared. The input data elements are then sorted in the ascending order, for example.

The two groups of two data elements (2, 10) and (6, 15) are supplied to the first processing element PE2 at the second stage. The first processing element PE2 at the second stage compares the input data elements and transfers four data elements to the next stage in the ascending order. The data elements in the same group such as (2, 10) are already sorted in the first processing element PE1 in the first stage. Therefore, the data elements in the different groups need only be compared. When a data element which is to be compared is not present in the opposite group, a data element which does not have the corresponding data element is compared with a predetermined value, for example, the infinite ($\infty$). When the data elements are to be sorted in the descending order, the above-described predetermined value is zero (0). The sorted set f1 (2, 6, 10, 15) is transferred to the merge engine ME and written in the buffer memories MO1 and MO2, respectively.

The data elements (3, 7, 10, 4, 9, 6, 1, 2) of the set f2 are input to the first processing element PE1 at the first stage of the sort engine SE after the data elements (2, 10, 15, 6) of the set f1 have been input. The data elements of the set f2 are sorted in the same manner as described above. When the data elements (3, 7, 10, 4) in the set f2 whose number is the same as that of the data elements of set f1, are sorted the sorted data elements (3, 4, 7, 10) are written in the memory BO1 of the merge engine ME. The processor PO1 compares the sorted data elements (2, 6, 10, 15) and (3, 4, 7, 10) in the memories MO1 and BO1 and detects the common data (10) between the subsets.

While the second procesing element RP1 merges two groups of sorted data elements the sort engine SE sorts the remaining data elements (9, 6, 1, 2) of the set f2. The sorted data elements (1, 2, 6, 9) are sequentially stored in the memory BO2 of the second processing element RP2. The second procesing element RP2 merges two groups of sorted data elements (2, 6, 10, 15) and (1, 2, 6, 9) in the same manner as in the second processing element RP1 and detects the common data elements (2, 6).

The sorted subsets of the set f2 which comprise the same number of data elements as that of the set f1 are alternately written in the memories BO1 and BO2 to be subsequently merged. The common data element groups which are obtained by the above merging operations are written in the output buffer memories OB1 and OB2. When the processing for all the input data elements is completed, the set f3 (10, 2, 6) is produced by the set operation.

This example is the operation of detecting the common data elements, but other operation between f1 and f2 may be executed in the same way. For example, this engine can detect the data elements satisfied with the condition f1>f2, f1<f2 and so on.

According to the relational algebra engine which executes the above operations, the processing results are obtained at extremely high speed. When the numbers of data elements of the sets f1 and f2 are, defined as n and m (n<m), respectively, n+m steps are required for data transfer. Further, when data transfer is completed, the following number of steps are required:

$$\log_2 n + 2n \quad (1)$$

Relation (1) is apparently independent of m, the number of data elements of the set f2. Here, $\log_2 n$ is the number of the processing elements of the sort engine SE required when the number of data elements is n, and 2n is the number of steps required for the final comparison of data elements in the merge engine ME. For example, as shown in FIG. 4, when the number of data elements of the sets is given a $n = 4$ and $m = 8$, $\log_2 4 + 2 \times 4 = 10$. The data transfer requires $n + m = 12$ steps. As a result, the sort and merge operations are completed in 22 steps.

The relational algebra engine according to the present invention has another advantage in that the memory capacity may be small. For example, the memories (MO1, MO2, BO1, BO2) of the merge engine ME are only required to have a capacity for storing the number of data elements of the set f1. Referring to FIG. 4, the memory is required to have the capacity of 4 words. Even if the set f2 has 10,000 data elements, the data elements are divided into groups of four data elements, and the sort operation is effected for each group of four data elements. The sorted results are alternately stored in the memories BO1 and BO2 of the merge engine ME. Therefore, the merging structure can be made simple. The output buffer memories OB1 and OB2 is required to store only the coincident data which is indicated by a circle, so that the capacities thereof may be small.

The above-mentioned advantages are based on the structure in which two processing elements RP1 and RP2 constitute the merge engine ME. On the other hand, if the merge operation is performed by one processing element RP1 or RP2, time required for the merge operation becomes longer than that required for the sort operation. Therefore, a large-capacity memory is necessitated which absorbs the time difference. If the number of the processing elements of the merge engine ME is increased, the second processing elements do not receive the inputs since the sort processing time is longer than the merge processing time. As a result, when two processing elements are disposed in the merge engine ME, the merge operation matches the sort operation, so that the relational algebra engine properly operates.

The sort engine SE continuously sorts, by the pipeline operation, the subsets g2 and g3 which have the same number of data elements as the number of data elements of the set f1. Therefore, time required for the sort operation is very short. Further, while the set f1 and the subset g2 of the set f2 are merged, the sort engine SE sorts the subset g3 of the set f2, thus accomplishng efficient processing. As is apparent from the above description, even if the number of data elements of the set f1 is larger than that in the above embodiment, the processing is continuously performed in a predetermined number of steps in accordance with relation (1).

The device according to the present invention is simple in constructon as shown in FIG. 3. The operation of this device is easily controlled. Since the processing elements of the same structure are connected in series through the common bus to the control processor, the sort result is read out from an arbitrary processing element. Therefore, the system design and implementation of the device may be easy. The number of stages of sort engine may be arbitrarily determined in accordance with the amount of data to be handled.

According to the relational algebra engine of the present invention, the set operation for a great amount of data in the data base system based on the relational model can be efficiently performed at high speed.

In the first embodiment, the algebra operational processing for the common set is described. However, other set operations may be also performed. For example, a join operation which is the most complicated set operation of the relational algebra of the relational data base system is performed at high speed. According to this join operation, for example, a new relation is established from two different relations by utilizing the common attribute. One set indicates the relation between a record number and a composer, as shown in Table 1. Another set indicates the relation between the record number and the title of a musical composition, as shown in Table 2. By using these sets, a new set which indicates the relation between the composer and the title of a musical composition is formed as shown in Table 3.

TABLE 1

| Record Number | Composer |
|---|---|
| 100 | T |
| 14 | O |
| 73 | S |
| 2 | H |
| 56 | I |
| 27 | B |
| 31 | A |

TABLE 2

| Record Number | Composer |
|---|---|
| 94 | s |
| 61 | o |
| 14 | k |
| 106 | e |
| 40 | n |
| 100 | h |
| 2 | w |
| 30 | a |
| 62 | l |
| 88 | m |
| 19 | x |
| 45 | d |
| 77 | f |

TABLE 3

| Record Number | Composer | Title |
|---|---|---|
| 2 | H | w |
| 14 | O | k |
| 100 | T | h |

The join operation is performed as follows. The sets in Tables 1 and 2 are sorted in accordance with the common attribute, that is, the record number. Thereafter, these sets are merged to extract the common record numbers. In accordance with the common record numbers, the corresponding composers and titles are extracted, respectively.

Figure 5:
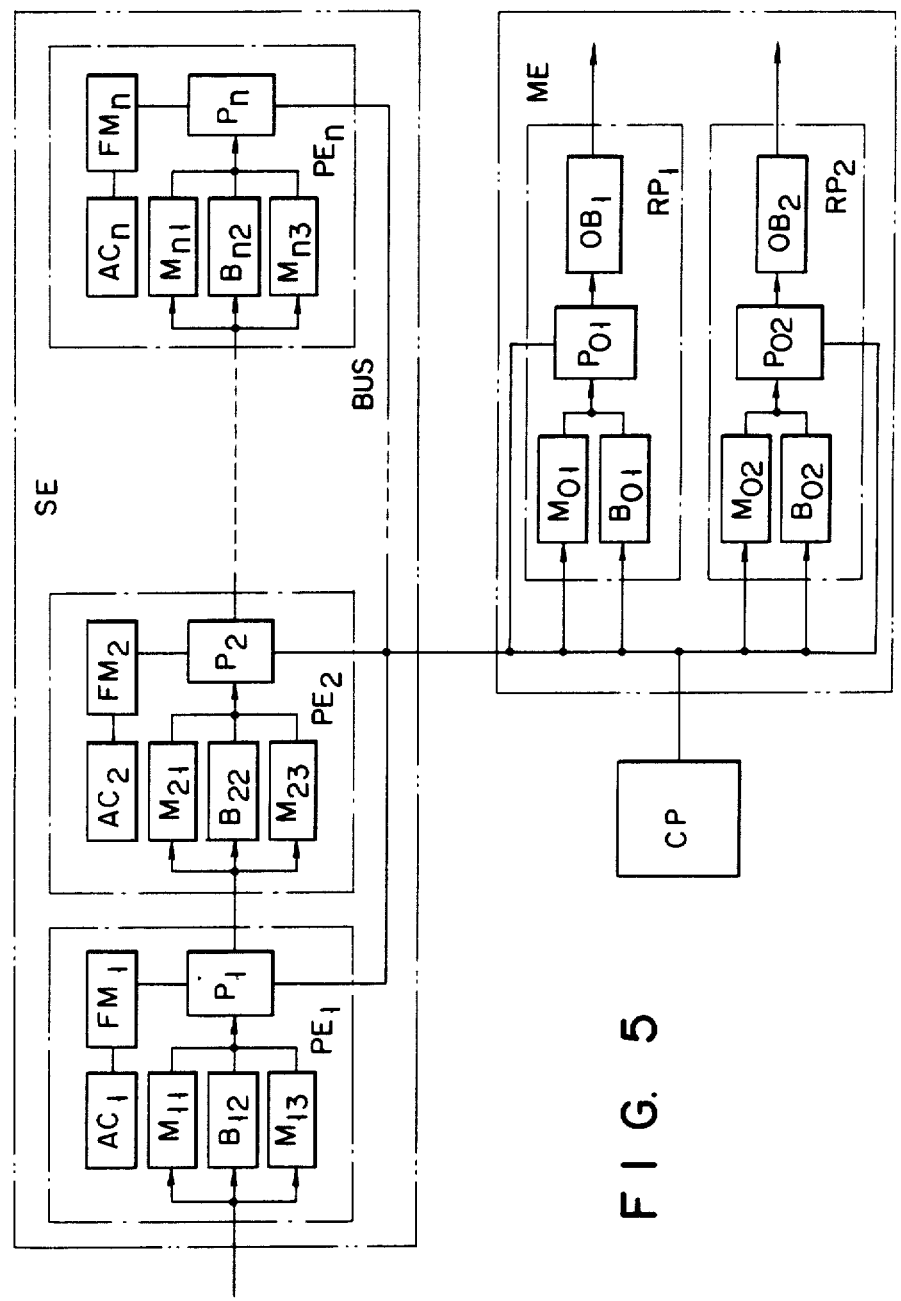
FIG. 5 is a block diagram of a relational algebra engine according to a second embodiment of the present invention.

In the set operations described so far, a set of data elements which have a plurality of attributes are stored in a memory. This set of data elements is sorted and the sorted groups of data elements are merged. As a second embodiment, a relational algebra engine which is capable of sorting data sets based on the attributes will be described with reference to FIG. 5.

The sort engine SE comprises a plurality of first processing elements PE1, PE2..., PEn which are connected in series. The first processing element PEk (k = 1, 2 ... , n) comprises the two buffer memories Mk1 and MK3, the memory Bk2 which has the FIFO function, the processor Pk which sorts input data elements in accordance with a predetermined rule by utilizing the buffer memories Mk1 and Mk3 and the memory Bk2, a flag memory FMk which stores processing steps of the processor Pk and an address counter ACk which controls the flag memory FMk. The memory Bk2 is a RAM which is capable of performing parallel access for reading out and writing data and which has the function of first-in/first-out (FIFO). The processor Pk compares data which are stored in the memories Mk1 and Bk2 or the memories Mk3 and Bk2 by utilizing the FIFO function of the memory Bk2. The processor Pk then transfers input data elements in the ascending order to the next stage. The sort results of the first processing element PEk are sequentially stored in the flag memory FMk which is controlled by the address counter ACk. The processor Pk sorts other attributes with reference to the sort results for the previously input attribute which have been stored in the flag memory FMK. In the sort engine SE, the processing elements PE1, PE2, . . ., PEn which are connected in series function as the pipeline so as to sort a series of data.

The first processing element PE1 sorts two data elements every time two data elements are input. The processing element PE2 at the second stage of the sort engine SE sorts two groups of sorted two data elements from processing element PE1. Within the same group, the data elements in each group have been already sorted. Therefore, comparison is only made between the data elements in different groups. This operaton is sequentially repeated. Therefore, a group of four data elements which have been already sorted is transferred to the next stage. In the same manner as described above, every time the processing element at each stage of the sort engine SE receives two groups of data element from the preceding stage, the sort processing is performed. When the data elements of one group are all read out, the data elements in the other group are compared with the infinitive ($\infty$) or zero (0).

The merge engine ME has the same structure as the merge engine ME in the first embodiment. The same reference numerals as in the second embodiment denote the same parts as in the first embodiment, and the detailed description thereof will be omitted.

The merge engine ME is connected to the sort engine SE and the control processor CP through the common bus. The control processor CP transfers the sorted results of the sort engine SE to the merge engine ME.

In order only to obtain the sorted results, the sorted results may be stored in the output buffer memories OB1 and OB2 through the memories BO1 and B02. The stored data may be accessed as needed. Alternatively, the stored results may be directly written in the output buffer memories OB1 and OB2 in accordance with the direct write mode.

The relational algebra engine with the above structure has advantages for executing the following operation. Table 4 shows relations each having the attributes such as the record number, the title, the composer, and the record company. Two attributes, for example, the record number and the composer are selected to arrange the data elements in the order of the record number. Table 5 shows the result of this operation.

TABLE 4

| Record Number | Title | Composer | Record Company |
|---|---|---|---|
| 3 | C | a | T |
| 5 | A | b | S |
| 6 | F | c | W |

TABLE 4-continued

| Record Number | Title | Composer | Record Company |
|---|---|---|---|
| 4 | B | d | T |
| 1 | E | e | W |
| 2 | D | f | T |

TABLE 5

| Record Number | Composer |
|---|---|
| 1 | e |
| 2 | f |
| 3 | a |
| 4 | d |
| 5 | b |
| 6 | c |

When the above set operation is to be performed, two methods for storing the relations in a memory are considered. First, tuple-groups such as (3, C, a, T), (5, A, b, S), . . ., (2, D, f, T). These groups are sequentially stored. Second, attribute - groups such as (3, 5, 6 . . . ), (C, A, F, . . . ), (a, b, c, . . . ) and (T, S, W, . . . ) are sequentially stored. In the above example, the method based on the attributes is more advantageous. In the set operation based on tuples, data of the title and the record company become redundant so that excessive data transfer time is required. On the other hand, in the method based on the attributes data of the record number and the composer may be transferred to the processor to execute the set operation. Therefore, the data transfer time between the memory and the processor can be shortened.

Figure 6:
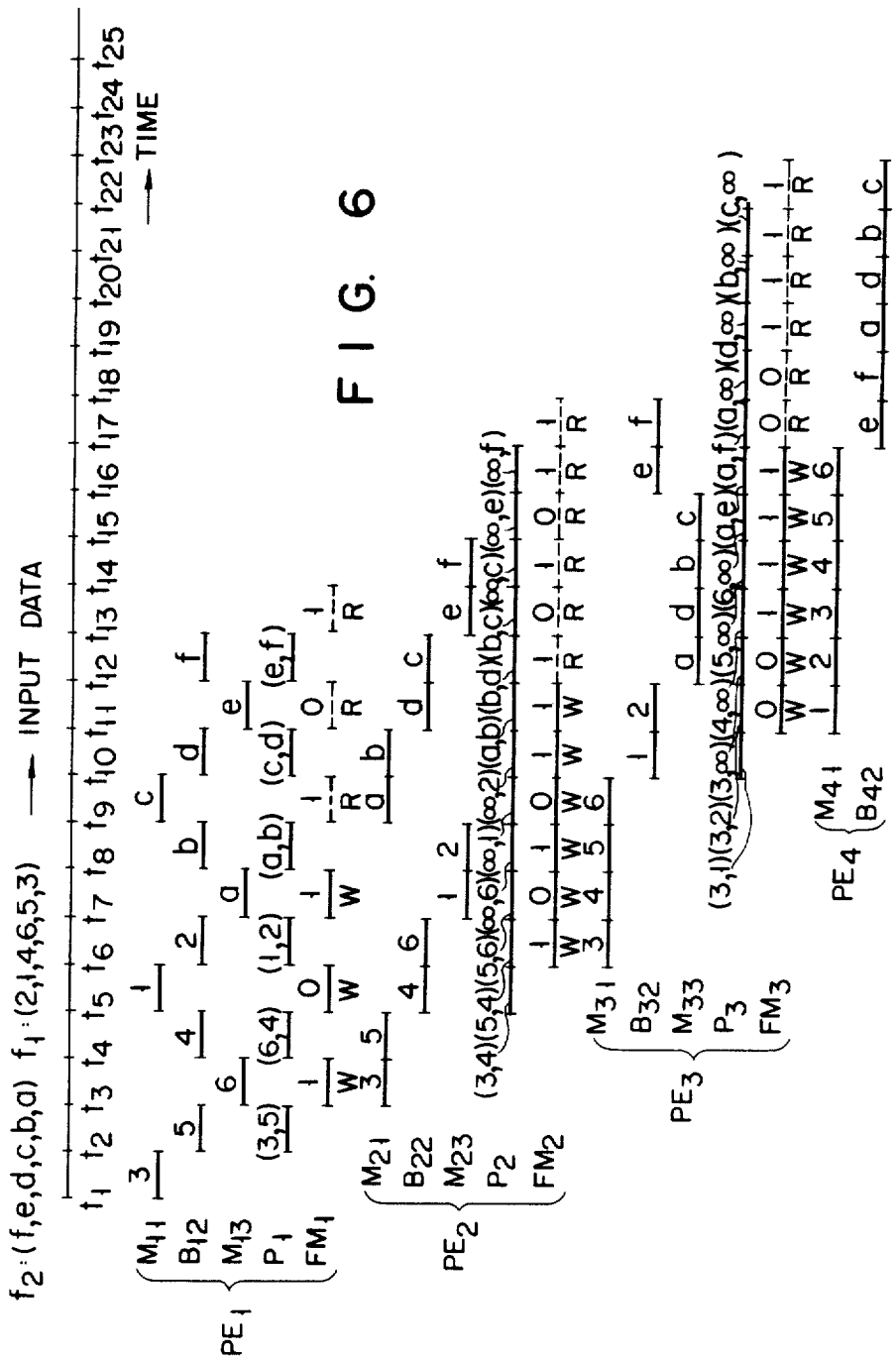
FIG. 6 is a timing chart for explaining the process of the relational algebra engine of FIG. 5.

The set operation of relational algebra engine according to the second embodiment of the present invention will be described with reference to the timing chart of FIG. 6. The set f1 has data (3, 5, 6, 4, 1, 2) of the record number. The set f2 has data (a, b, c, d, e, f) of the composer. The data (3, 5, 6, 4, 1, 2) of the record number are first input and sorted in the same manner as in the first embodiment. The sort processing result of the processor Pk is stored in the flag memory FMk (k = 1, 2 , . . . , n). The processor Pk compares data from the buffer memory Mk1 or Mk3 with data from the memory Bk2 which has the FIFO function. In case of the ascending order, if the result of comparison shows that the data stored in the buffer memory Mk1 or Mk3 is smaller than the data in the memory Bk2, then "1" is written in the flag memory FMk. On the other hand, if the result is contrary, then "0" is written in the flag memory FMK. The data (a, b, c, d, e, f) of the composer which are input after the data of the record member are processed by the processor Pk on the basis of the corresponding sort results of the record number which have been stored in the flag memory FMk. In the figure, W denotes the operation for writing the sort results in the flag memory FMk. R denotes the operation for reading out the sort results from the flag memory FMk. Therefore, the sets f1 and f2 are sorted in the first processing elements PE1, PE2, and PE3. The sorted results are stored in the memories M41 and B42 of the first processing element PE4. The stored data is read out through the merge engine ME as needed.

In the second relational algebra engine, the sort processing of data is continously performed in the pipeline manner, accomplishing processing effectively in a short period of time. Further, other attributes may be easily sorted in accordance with the order of the sorted attribute.

As described above, a new relation can be established from one relation. Further, a new relation from a plurality of relations, that is, the join operation, may also be accomplished.

What we claim is:

1. A relational algebra operator for sorting and merging successively supplied first and second sets of data elements each having key and satellite attributes, the number of data elements of said first set being smaller than that of said second set, comprising:

a sort processor having sort processing elements serially connected in a plurality of stages numbered 1, 2, ... n, each stage having an input and an output, first and second buffer memories, a third memory having a first-in/first-out (FIFO) function, said first to third memories being connected to receive data elements from said input, and sort processing means connected to said first to third memories for sorting said data elements read out of said memories;

in the k-th stage sort processing means, where k equals any number from 1 to n, said first to third memories being arranged to successively receive from said input groups of data each group consisting of $2^{k-1}$ data elements, in a predetermined sequence of said first, third, second, third, first, ... memories, and said sort processing means being arranged to successively carry out comparisons between groups of data read out of said first and third memories and between groups of data read out of said second and third memories with respect to the key attribute and to successively transfer to said output groups of data each consisting of $2^k$ data elements which have been sorted with respect to the key attribute; and a merge processor including first and second merge processing elements, connected in parallel, each of said merge processing elements having a fourth buffer memory, a fifth memory having a FIFO function, and merge processing means connected to said fourth and fifth memories for performing a join by merging relational algebra operation on sorted data elements read out of said fourth and fifth memories with respect to the key attribute;

in said first and second merge processing elements said fourth memories being arranged to simultaneously receive the first set of data elements which have been sorted by said sort processor, said fifth memories being arranged to alternately receive first and second subsets of data elements of said second set which have been sorted by said sort processor, and said first and second subsets each having the same number of data elements as said first set.

2. A relational algebra operator according to claim 1, wherein the data of the key attribute are each a numerical value; and said sort processor is arranged to sort the data elements in the ascending order of key attribute.

3. A relational algebra operator according to claim 1, wherein the data of the key attribute are each a numerical value; and said sort processor is arranged to sort the data elements in the descending order of the key attribute.

4. A relational algebra operator for sorting a set of data elements each having key and satellite attributes so as to successively receive a first set of data of the key attribute and a second set of data of the satellite attribute, corresponding data of the key and satellite attributes having the same order in the first and second sets, and to sort the second set of data in accordance with sort results of the first set of data, comprising:

a sort processor having sort processing elements serially connected in a plurality of stages numbered 1, 2, ... n, each stage, each stage of said sort processing elements including an input and an output, first and second buffer memories, a third memory having a FIFO function, said first third memories being connected to receive data from said input, sort processing means connected to said first to third memories for sorting data read out of said first to third memories; and a flag memory for successively storing information representing the sort results of data in said sort processing means;

in the k-th stage sort processing means, where k equals any number from 1 to n, said first to third memories being arranged to successively receive from said input groups of data each group consisting of $2^{k-1}$ data elements in a predetermined sequence of said first, third, second, third, first . . . memories, and said sort processing means being arranged to successively carry out comparisons between groups of data read out of said first and second and third memories and between groups of data read out of said second and third memories with respect to the key attribute to successively transfer to said output groups of data each consisting of $2^k$ data elements which have been sorted with respect to the key attribute, to write into said flag memory informtion of each result of data comparisons each time a data comparison is carried out, and to sort the data of the satellite attribute which is successively applied to said first to third memories after the data of the key attribute in accordance with the information stored in said flag memory, which represents the sort result of the corresonding data of the key attribute.

5. A relational algebra operator according to claim 4, wherein the data of the key attribute are each a numerical value; and said sort processor is arranged to sort the data elements in the ascending order of the key attribute.

6. A relational algebra operator according to claim 4, wherein the data of the key attribute are each a numerical value; and said sort processor is arranged to sort the data elements in the descending order of the key attribute.

* * * * *